Figure 1:
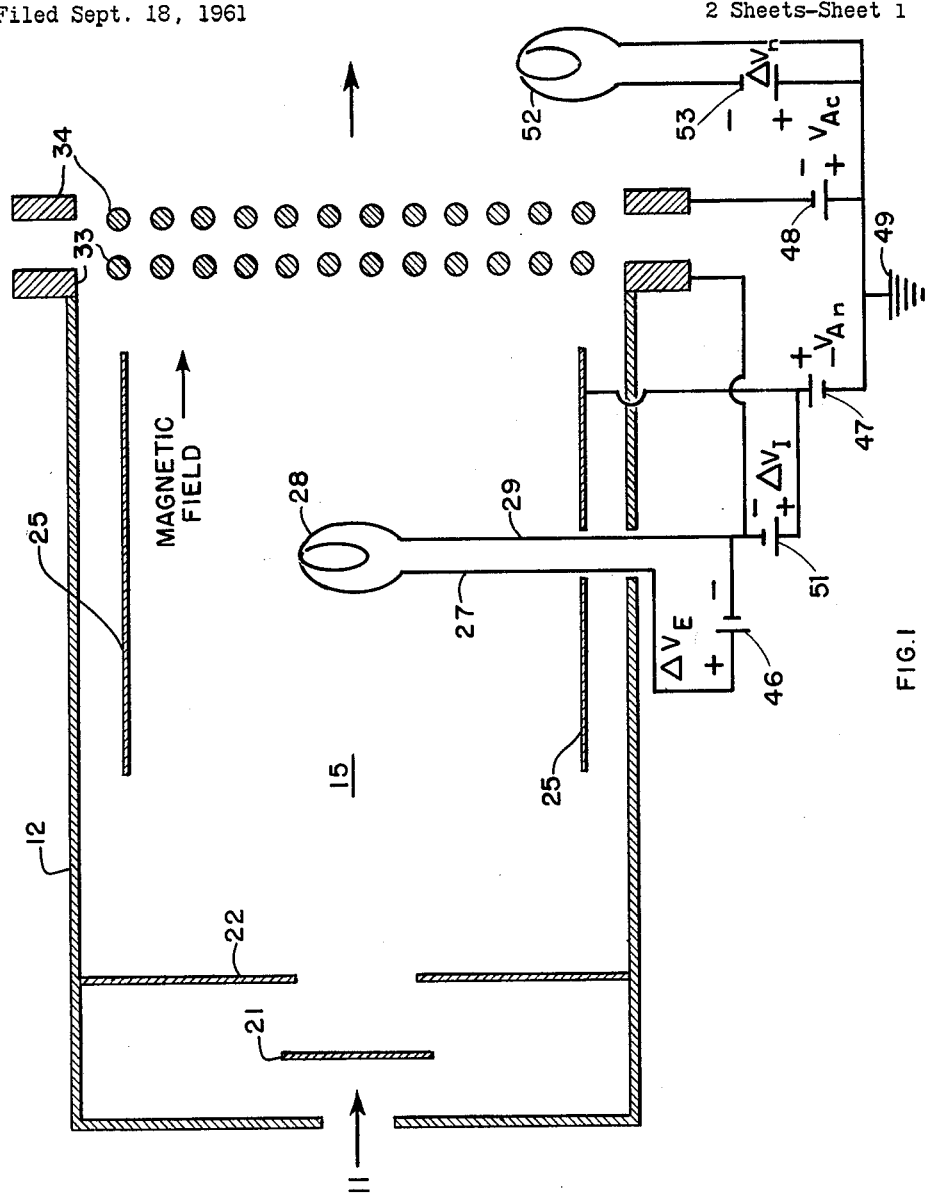

Nov. 10, 1964    H. R. KAUFMAN    3,156,090
ION ROCKET

Filed Sept. 18, 1961    2 Sheets-Sheet 1

INVENTOR
HAROLD R. KAUFMAN

BY

ATTORNEY

United States Patent Office 3,156,090
Patented Nov. 10, 1964

3,156,090
ION ROCKET
Harold R. Kaufman, Berea, Ohio, assignor to the United States of America as represented by the Administrator of the National Aeronautics and Space Administration
Filed Sept. 18, 1961, Ser. No. 139,007
10 Claims. (Cl. 60—35.5)
(Granted under Title 35, U.S. Code (1952), sec. 266)

The invention described herein may be manufactured and used by or for the Government of the United States of America for governmental purposes without the payment of any royalties thereon or therefor.

The invention relates generally to electrostatic ion rocket engines and, more particularly, to an electrostatic ion rocket engine utilizing electron bombardment.

The great interest exhibited in ion rockets stems from their capacity to supply extremely high values of specific impulse. Chemical rockets are limited to values of specific impulse in the neighborhood of 400 seconds by the available chemical enthalpy in the propellants. Nuclear thermal rockets are limited to a specific impulse around 800 seconds by reason of material limitations. However, ion rockets are capable of providing a specific impulse of 10,000 seconds, or even higher, if desired.

The specific impulse required of an ion rocket engine is determined by the mission and vehicle design parameters. For missions ranging from satellite launching to interplanetary flights, the rocket engine must provide specific impulses from 1000 to 40,000 seconds for vehicles which are considered to be feasible at present. In addition to satisfying the requirement of specific impulse, the rocket engine must also be able to operate continuously for relatively long time periods. It must be lightweight and it must operate on reasonable voltages, currents, and frequencies. Furthermore, it must be of moderate size to fit within the shadow of the radiation shields on nuclear powered vehicles. Additionally, the engine must be rugged enough to withstand launching into satellite orbit. It also must have a high power efficiency and propellant utilization efficiency.

Briefly, the electrostatic ion rocket engine of this invention comprises an engine chamber having a propellant supply system which is a heated boiler at the upstream end of the engine chamber. The propellant in the boiler is vaporized and enters the engine as a gas. This propellant gas, after entering the chamber, is dispersed by a distributor and is then ionized by high-velocity electrons which are emitted by a hot filament cathode, which is referred to as the ionizer, situated in the chamber downstream from the distributor. The electrons emitted from the ionizer gyrate about magnetic field lines created by magnetic coils encircling the engine until they collide with atoms or other electrons which cause them to drift to an anode situated within the chamber. This anode is maintained at a positive potential relative to the cathode. Some of the collisions of electrons with atoms produce ions; thus, the electrons and ions in the ion chamber constitute plasma. Some of the ions, formed by the electron collisions with neutral atoms, drift toward a first grid which is called the screen grid and is situated at the downstream end of the chamber. A second grid called the accelerator grid is situated downstream from the screen grid and is maintained at a highly negative potential relative to the screen grid. This second grid serves to greatly accelerate the ions while the first grid directs these ions away from the accelerator grid to avoid destructive erosion. Finally, for space application, a neutralizer is located downstream from the chamber proper which serves to emit electrons into the ion beam in order to neutralize both the charge density and the current of the ion beam.

Accordingly, an object of this invention is to provide a rocket engine which will operate continuously for relatively long periods of time.

An additional object of this invention is to provide a rocket engine which is relatively lightweight and small in size.

A further object of the herein invention is to provide a rocket engine which has a high power efficiency.

One other object of the invention is to provide an electric ion rocket engine utilizing electron bombardment to produce ions.

A still further object of the invention is to provide a rocket engine which is rugged enough to withstand launching forces.

One further object of the invention is to provide an ion rocket engine which can use a variety of propellants having desirable storage and handling characteristics.

Still another object of the invention is to provide an ion rocket engine which has high power efficiency at specific impulses as low as 5000 seconds.

Figure 2:
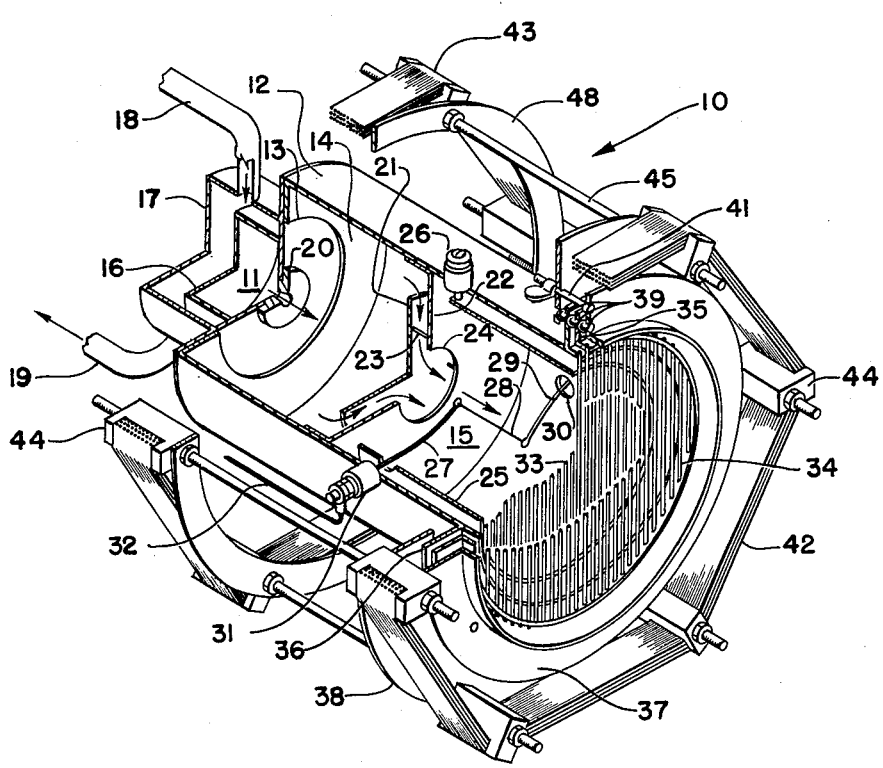

Other objects and many attendant advantages of the present invention will be apparent from the following detailed description when taken together with the accompanying drawings in which:

FIG. 1 is a schematic diagram of an ion rocket engine and electrical circuitry; and FIG. 2 is a partially-sectioned pictorial view of one embodiment of the ion rocket engine of this invention.

For illustrative purposes, reference is made to FIG. 1 wherein a schematic diagram of the ion engine employing an electron bombardment ion source is shown, as well as a schematic representation of the electrical circuitry employed in the engine and the neutralizer. A propellant 11 enters as a gas and passes over a distributor plate 21 and through an apertured plate 22. This serves to distribute the flow into an ion chamber 15 and also prevents escape of electrons emitted from a hot filament or ionizer 28 from the ion chamber 15. This gas in the ion chamber 15 is ionized by high velocity electrons in the range of energies from about 20 to 100 electron volts which are emitted by the hot filament 28. A screen 33, the structure of plates 21 and 22, and the negative end 29 of the filament 28 are all operated at the same potential. Thus, an electron emitted from the filament 28 should not go to either end of the ion chamber 15. A magnetic field induced by magnetic coils, not shown in this schematic, parallel to the axis of the chamber prevents the high-velocity electrons from reaching the walls of the chamber without first colliding with particles in the ion chamber. Some of the ions that are formed pass through the screen 33 at the downstream end of the chamber and are accelerated by the accelerating grid 34 to become an ion beam. A neutralizer 52 serves to neutralize the ion beam through the emission of electrons into the beam.

Referring now to FIG. 2, an ion engine 10 is shown with a cylindrical casing 12 having a centrally-apertured 13 upstream end plate 14 and defining an ion chamber 15 therein. The propellant 11 is supplied from a cylindrical container or boiler 16 which normally stores the propellant 11, such for example as mercury, and is externally affixed to end plate 14 about the aperture 13. Boiler 16 is enclosed by a tubular-shaped steam jacket 17 which is also secured to the end plate 14 of the casing 12. The steam jacket 17 is provided with input and output lines, respectively, designated by reference numerals 18 and 19 which are connected to a steam source (not shown) providing for circulation of a heating medium through the jacket 17, thereby causing the propellant to vaporize within the boiler 16. The propellant enters the ion chamber 15 through a central orifice 20 which can be removed and replaced with other size orifices and passes around plate 21 and through an aperture 24 provided in plate 22. Plates 21 and 22, together with spacer pins 23 which separate the two plates, comprise a distributor structure to effect a distribution of the propellant. The flow of the propellant around the distributor plate 21 and through the aperture 24 is indicated by the arrows shown.

The volume within the chamber 15 between the centrally-apertured plate 22 and accelerator wires 33 is the region within which the ionization of the propellant takes place. A cylinder 25 which functions as the anode is concentrically supported within the outer casing 12 by an insulated anode support device 26 situated on the outer casing 12. The portion of the anode support member 26 that passes through the casing 12 is of an insulating material such as boron nitride and thus the cylindrical anode 25 is completely insulated from the outer casing 12. A series of support members 26 are used, though only one is shown in the pictorial view of the figure. Two rod-like arms 27 and 29, which extend through apertures 30 formed in diagrammatically opposite points of the cylindrical anode 25, suspend a tungsten filament 28 therebetween which is the ionizer or cathode. These arms 27 and 29 are rigidly situated in relation to the outer casing 12 by means of insulated supports 31 located on the outer casing 12. The arms 27 and 29 are of an electrical conductive material such as stainless steel and are seated within a center portion of the insulated supports 31, which center portion is of an insulating material such as boron nitride. Thus, there is no electrical contact between the arms 27 and 29 and the outer casing 12. An electrical lead 32 is connected to the support 31 and serves to supply the necessary electrical energy to the ionizer filament 28 from a source not shown, this electrical energy being carried by the arms 27 and 29 to the ionizer 28.

A screen 33 composed of a first plurality of closely-spaced parallel tungsten wires is affixed to the downstream end of the outer casing 12. Parallel to screen 33 are accelerator grid wires 34 which likewise are of tungsten and are supported by a circular frame 35 situated downstream from a flange 36 affixed to the casing 12 of the engine. The aforementioned screen 33 and accelerator wires 34 are preferably suspended freely within their respective support members to allow for normal thermal expansion thereof. The accelerator grid support frame 35 is insulated and maintained in a permanent relative position to the screen grid 33 by means of sapphire insulating balls 39 and large rings 37 and 38 located downstream and upstream, respectively, of the grid support frame 35 and flange 36. Within the first large ring 37, the second large ring 38, the flange 36, and the circular frame 35, there are a series of small apertures in which insulating balls 39, which may be of sapphire, are seated between each relative member, with the apertures being slightly smaller in diameter than the diameter of the insulators 39. Three or more rows of the sapphire insulators thus separate the four members 35, 36, 37, and 38 and are equally positioned about the circumference of the engine. A wing nut and bolt arrangement 41 is situated adjacent to each row of insulating balls 39 and is attached between the two larger discs 37 and 38. Upon tightening of the wing nut, the ball-shaped insulators 39 are caused to seat in the apertures provided and thus maintain a necessary relative spacing between the two grids and provide the necessary alignment of the screen to the accelerator grid. By means of the aforementioned three rows of ball-shaped insulators, the accelerator grid 34 and its support frame 35 there is no direct contact with the other members of the engine and thus they are electrically insulated from such other members.

The screen 33 and the accelerator grid wires 34 at the downstream end of the ion chamber 15 focus and accelerate ions that reach that end. The thrust producing mechanism of this device is the momentum change of the ions as they are accelerated by the electrostatic field which is applied between the screen 33 and the accelerator grid wires 34.

A magnetic field winding to prevent the electrons from reaching the chamber walls without first colliding with other particles is comprised of two coils 42 and 43 which may be of enameled-covered copper wire, which are supported about the casing 12 of the engine by being wrapped around equidistantly spaced U-shaped boron nitride support members 44. A plurality of rods 45 pass through and secure the support members 44 in a relative permanent position which is facilitated by the rods 45 additionally passing through apertures provided in rings 38 and 48.

To illustrate the electrical diagramming of the engine, reference is again made to FIG. 1 where a battery 46 provides the potential difference $\Delta V_E$ across the ionizer 28 which is sufficient to heat this filament to emit the necessary electrons. A second battery 47 provides an anode 25 potential relative to an effective ground 49, $V_{An}$, which can vary from one to several thousand volts, with the greater voltage resulting in greater ion velocities. As can be seen then, the potential of the plasma and ions within the chamber 15 is essentially the potential of the anode 25 which is potential $V_{An}$. The voltage maintained upon the accelerator grid 34 is the potential $V_{Ac}$ provided by a battery 48 which may be $-500$ to $-1000$ volts with respect to the ground 49. Thus, it can be seen that the accelerator 34 has a potential that is highly negative in respect to that of the screen 33 and as a result, the positive ions are greatly accelerated by this highly negative potential. A voltage potential $\Delta V_I$ of, for example, 20 to 100 volts is maintained between the ionizer 28 and the anode 25 by battery 51. Without this potential difference, there would be no emission of electrons from the emitter 28 since there is no other potential difference between the emitter and the anode 25 to pull the electrons off the emitter. The aforementioned heating voltage for the emitter 28, $V_E$, is merely for the purpose of heating this emitter and does not serve to maintain this necessary potential drop between the emitter and the anode. It should be established that the given voltages for the various components of the engine are by way of specific example only, and that within the realm of operability these voltages may vary considerably without the ranges herein described.

Electrons which have separated from the ions within the chamber 15 must be ejected to prevent negative charging of the vehicle. Thus, proper operation will result in equal rates of ion and electron ejector rates and zero net beam current. These electrons must be forced away from the high potential of the anode 25 to which they are attracted. The power involved in accelerating the ions may be thought of as the generator power required to pump electrons from the high anode potential to ground. The electrons must not only be ejected from the vehicle at the proper rate, but they must also be at a moderate velocity to neutralize the ion space charge. This can be accomplished by connecting a neutralizer 52 to ground 49. As can be seen, the electrons that are absorbed by the anode 25 can follow a circuit to the ground 49, which ground is usually the space vehicle. From there the electrons could pass to the neutralizer 52 which is also connected to the ground 49. A potential difference $\Delta V_n$ provided by a battery 53 heats the filament comprising the neutralizer 52 causing emission of electrons into the positive ion stream effecting neutralization. Without such neutralization, the positive ions would tend to accumulate about the negatively-charged space ship and thus impede the flow of additional ions from the ship in a satisfactory beam.

The magnetic field strength is compromised in the engine for ionization efficency and radial inflow of ions. If the magnetic field is too weak, the high velocity ionizing electrons which diffuse to the anode by a collision process are not contained and the ion production suffers. At the other extreme, if the magnetic field is too strong, the plasma resistivity in the radial direction is increased. The escape of low velocity electrons which are produced in the ionization process can then take place only with a large radial potential difference. Such a potential difference causes a radial inflow of ions which leads to a non-uniform ion current density through the accelerator system and increased accelerator impingement. A magnetic field obtained from a compromise is quite low—well below 100 gauss for a four-inch diameter ion chamber.

In operation, the vaporized propellant 11 from the boiler 16 flows through the orifice 20 which controls the propellant flow rate and passes around the distributor plate 21 into the ion chamber 15. High-velocity electrons from the thermionic emitting cathode 28 bombard the neutral propellant in the chamber 15, and some of this gas is ionized. The magnetic field formed by the coils 42 and 43 contains these high-velocity electrons to increase the efficiency of the ionization process. Some of the ions pass through the screen 33 and are accelerated by the grid 34 to form an ion beam that is neutralized by the filament 52.

It should be understood that the particularly disclosed ion engine is by way of specific example only, and that many modifications and variations may transpire in the development and production of any given novel engine resulting from this invention. The individual components that comprise the novel ion rocket engine are essential elements to the combination of this invention but their particular configuration or material of construction is subject to wide discretion. Thus, for example, the distributor arrangement for the propellant may be other than as particularly shown as long as it serves to disburse the incoming propellant. The anode does not necessarily have to be a separate cylindrical element but could actually be an insulated part of the wall of the chamber. As another example of possible modification, the neutralizing element could be in the form of a grid similar to the grids used for the screen and accelerator.

As can readily be seen, many modifications to the structural configuration of the various elements are possible within the realm of the invention, and the novelty and advance in the art is related to the novel combination of the various elements aforementioned in this disclosure. It is, therefore, to be understood that within the scope of the appended claims the invention may be practiced other than as specifically described.

What is claimed is:
1. An electrostatic ion rocket engine comprising
a casing having upstream and downstream ends, the volume within said casing defining an engine chamber,
propellant supply means situated adjacent to said upstream end of said casing wherein a propellant is heated to the gaseous state before injection into said chamber,
means to distribute the propellant within said chamber,
a hot filament cathode situated within said chamber downstream from said distributor means whereby the propellant gas is ionized by high-velocity electrons emitted from said cathode,
means for energizing said cathode to effect generation of electrons therefrom,
anode means surrounding said cathode, said anode means being provided with a plurality of apertures,
means to spatially support said anode within said chamber, said anode support means insulating said anode from said casing,
cathode support arms extending inwardly from said casing through the apertures in said anode whereby said cathode is supported within said anode means,
means for attaching to and insulating from said casing said cathode support arms,
means for maintaining said anode means at a positive potential difference relative to said cathode,
a plurality of electromagnetic coils surrounding said casing whereby electrons emitted from said cathode filament are caused to gyrate about magnetic field lines created by said coils until some of the electrons collide with the neutral atoms of the propellant gas forming thereby ions, while some of the electrons drift to said anode means,
first grid means situated on said downstream end of said casing,
means to maintain said first grid means at a voltage potential negative to said anode means whereby the ions formed are caused to drift to said first grid means,
second grid means spatially displaced downstream from said first grid means,
means to maintain said second grid means at a potential highly negative to said first grid means whereby the ions are accelerated by said second grid means,
neutralizer means situated downstream from said second grid means, and
means to energize said neutralizer means for effecting generation of electrons therefrom whereby the electrons neutralize the ions being emitted from said chamber.

2. An electrostatic ion rocket engine comprising
a casing having upstream and downstream ends, the volume within said casing defining an engine chamber,
propellant supply means situated adjacent to said upstream end of said casing wherein a propellant is heated to the gaseous state before injection into said chamber,
means to distribute the propellant situated within said chamber,
means disposed within said chamber for dispersing the propellant within said chamber,
a hot filament cathode situated within said chamber downstream from said distributor means whereby the propellant gas is ionized by high-velocity electrons emitted from said cathode,
means for energizing said cathode to effect generation of electrons therefrom,
anode means disposed within said chamber and surrounding said cathode,
means for maintaining said anode means at a positive potential difference relative to said cathode,
a plurality of electromagnetic coils surrounding said casing whereby electrons emitted from said cathode filament are cause to gyrate about magnetic field lines created by said coils until some of the electrons collide with the neutral atoms of the propellant gas forming thereby ions, while some of the electrons drift to said anode means,
first grid means situated on said downstream end of said casing,
means to maintain said first grid means at a voltage potential negative to said anode means whereby the ions formed are caused to drift to said first grid means,
second grid means spatially displaced downstream from said first grid means,
means to maintain said second grid means at a potential highly negative to said first grid means whereby the ions are accelerated by said second grid means,
neutralized means situated downstream from said second grid means, and
means to energize said neutralizer means for effecting generation of electrons therefrom whereby the electrons neutralize the ions being emitted from said chamber.

3. An electrostatic ion rocket engine comprising
a cylindrical casing having upstream and downstream ends, said upstream end being centrally apertured and said downstream end being open,
boiler means situated adjacent to said upstream end of said casing, said boiler means containing the propellant used in said engine, means surrounding said boiler means to heat said boiler means and the propellant therein, means situated within said casing for distributing said propellant within said casing, cathode means for emitting electrons situated within said casing downstream from said distributor means, anode means situated within said casing and surrounding said cathode means, means for electrically insulating said anode means and said cathode means from said casing, first grid means situated on said downstream end of said casing, said first grid means being maintained at a voltage potential negative to said anode means, second grid means spatially displaced downstream from said first grid means, said second grid means being maintained at a potential highly negative to said first grid means, means for electrically insulating said first grid means from said second grid means, and means surrounding said casing for inducing a magnetic field within said casing.

4. The engine set forth in claim 3 wherein said cathode means comprises a wire filament.

5. The engine set forth in claim 3 wherein said anode means comprises a cylinder whose sides are parallel to the sides of said casing, said anode means being supported within and electrically insulated from said casing.

6. An electrostatic ion rocket engine comprising a casing having upstream and downstream ends, said upstream end being apertured and said downstream end being open, boiler means situated adjacent said upstream end of said casing for containing the propellant used in said engine, means surrounding said boiler means to heat said boiler means and the propellant therein, means situated within said casing for distributing the propellant within said casing, cathode means for emitting electrons situated within said casing downstream from said distributor means, anode means situated within said casing and surrounding said cathode means, means for electrically insulating said anode means and said cathode means from said casing, first grid means situated on said downstream end of said casing, said first grid means being maintained at a voltage potential negative to said anode means, second grid means spatially displaced downstream from said first grid means, said second grid means being maintained at a potential highly negative to said first grid means, and means surrounding said casing for inducing a magnetic field within said casing.

7. An ion rocket engine comprising a casing having upstream and downstream ends, means attached to said casing at said upstream end for containing the propellant used, means to heat the propellant, means situated within said casing for distributing the propellant within said casing, cathode means within said casing downstream from said distributor means for emitting electrons, anode means situated within said casing, first grid means situated adjacent to said downstream end of said casing, said first grid means being maintained at a voltage potential negative to said anode means, second grid means spatially displaced downstream from said first grid means, said second grid means being maintained at a potential highly negative to said first grid means, and means for inducing a magnetic field within said casing.

8. An electrostatic ion rocket engine comprising a casing defining an engine chamber, an annular anode within said chamber, means for feeding a propellant into said chamber toward said anode, a heated filament within said anode for bombarding said propellant with high-velocity electrons in the range of energies from about 20 to about 100 electron volts to form ions, means for forming a magnetic field about said casing to prevent said high-velocity electrons from reaching the walls thereof without first colliding with propellant particles in said chamber, and means for accelerating said ions away from said casing.

9. An electrostatic ion rocket engine as claimed in claim 8, including a screen adjacent the engine chamber having a voltage potential substantially equal to that of the heated filament, and a grid spaced from said screen away from said chamber and having a potential highly negative to said screen for accelerating ions passing therethrough, said screen being in substantial alignment with said grid for shielding the same from the ions to reduce erosion.

10. An electrostatic ion rocket engine as claimed in claim 9, including neutralizing means mounted on the opposite side of said grid from said screen for neutralizing said accelerated ions.

References Cited in the file of this patent

UNITED STATES PATENTS

| | | |
|---|---|---|
| 1,809,115 | Goddard | June 9, 1931 |
| 2,826,708 | Foster | Mar 11, 1958 |
| 2,880,337 | Langmuir et al. | Mar. 31, 1959 |
| 2,969,475 | Berghaus | Jan. 24, 1961 |
| 3,014,154 | Ehlers et al. | Dec. 19, 1961 |
| 3,041,824 | Berhman | July 23, 1962 |
| 3,050,652 | Baldwin | Aug. 21, 1962 |
| 3,052,088 | Davis et al. | Sept. 4, 1962 |

OTHER REFERENCES

Scientific American publication, vol. 204, No. 3, March 1961; pages 57, 58 and 61–65 relied on.

Scientific American publication, "The Plasma Jet," vol. 197, No. 2, August 1957; pages 80–86 relied on.